Feb. 20, 1973  M. C. BISKEBORN ET AL  3,717,716
PLASTIC INSULATED CONDUCTOR COMMUNICATIONS CABLE WATERPROOFED
WITH AN INTERNAL VOID-FILLING MIXTURE OF PETROLEUM JELLY
AND HIGH MOLECULAR WEIGHT POLYETHYLENE OR POLYPROPYLENE
Original Filed Dec. 2, 1968  2 Sheets-Sheet 1
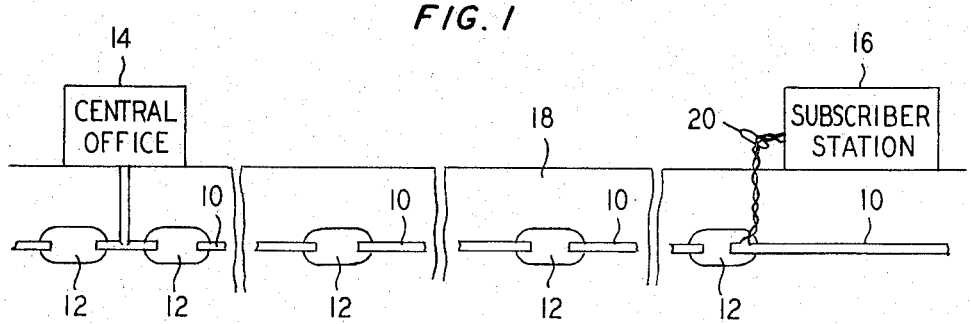
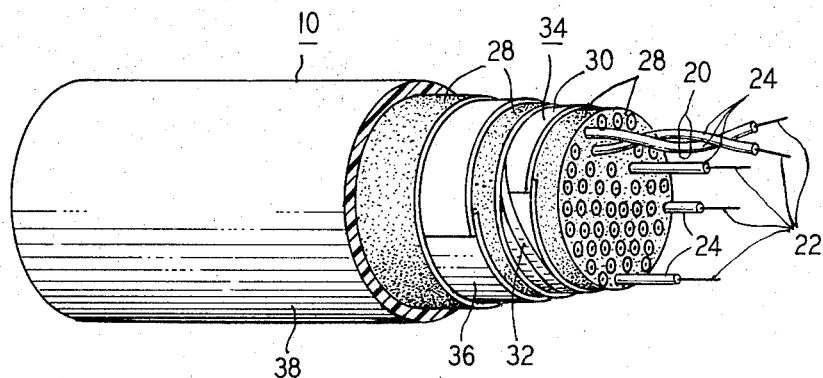
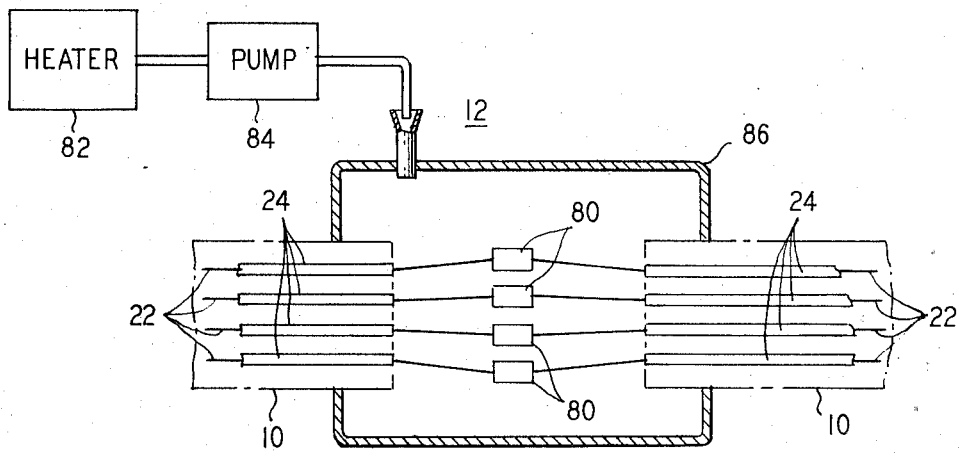
INVENTORS M. C. BISKEBORN
J. P. MC CANN
R. A. SABIA
BY Charles E. Frang
ATTORNEY

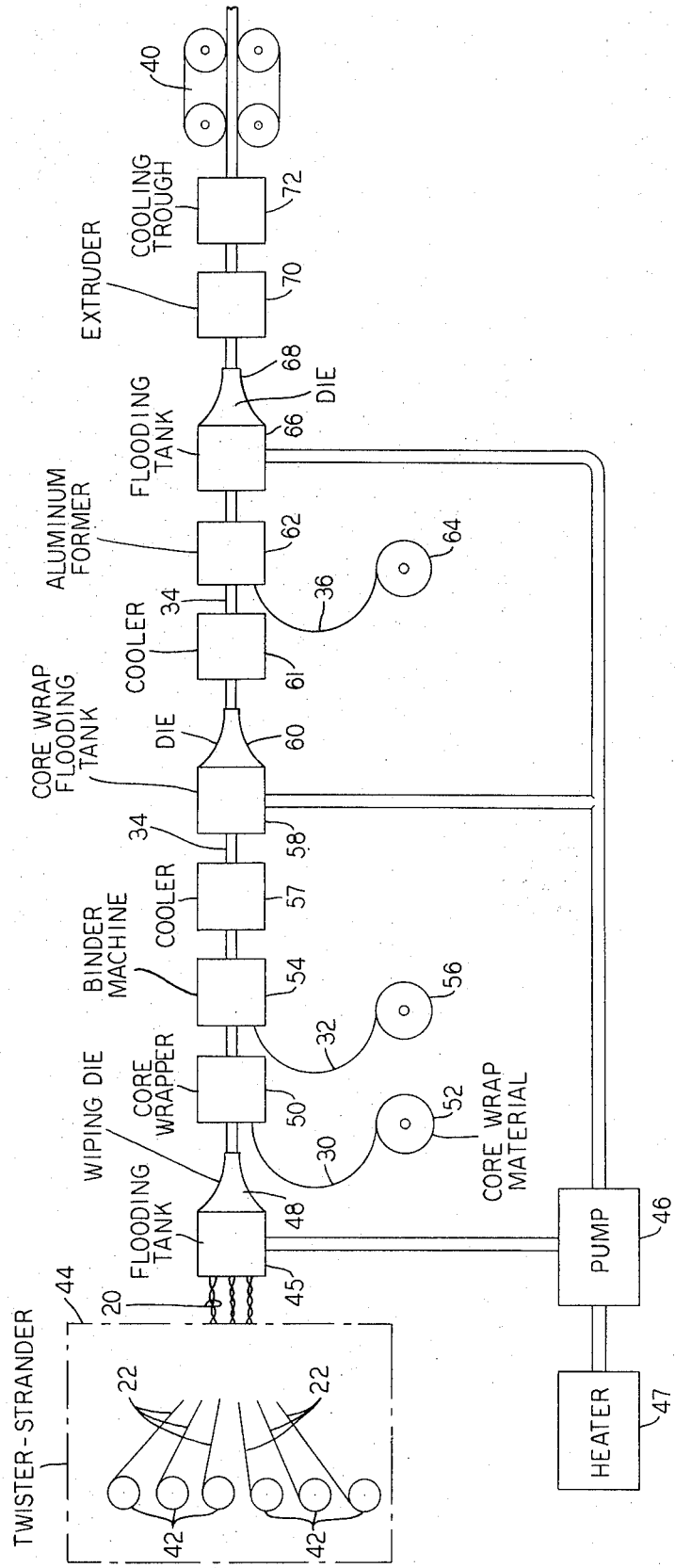

United States Patent Office 3,717,716
Patented Feb. 20, 1973

3,717,716
PLASTIC INSULATED CONDUCTOR COMMUNICATIONS CABLE WATERPROOFED WITH AN INTERNAL VOID-FILLING MIXTURE OF PETROLEUM JELLY AND HIGH MOLECULAR WEIGHT POLYETHYLENE OR POLYPROPYLENE
Merle C. Biskeborn, Chatham, Joseph P. McCann, Colonia, and Raffaele A. Sabia, Lincroft, N.J., assignors to Bell Telephone Laboratories, Incorporated, Murray Hill and Berkeley Heights, N.J.
Original application Dec. 2, 1968, Ser. No. 780,314, now Patent No. 3,607,487, dated Sept. 21, 1971. Divided and this application Oct. 7, 1970, Ser. No. 78,736
Int. Cl. H01b 7/02
U.S. Cl. 174—25 R     5 Claims

ABSTRACT OF THE DISCLOSURE

An electrical communications cable having a plurality of insulated conductors is made waterproof by filling the intersticial spaces with a heated mixture of 85 percent petroleum jelly and 15 percent high molecular weight polyethylene and cooling the mixture.

BACKGROUND OF THE INVENTION

This is a division of application Ser. No. 780,314, filed Dec. 2, 1968, now Pat. No. 3,607,487.

This invention relates to communications cables, particularly buried cables which are subject to influx of water, or to entry and condensation of water vapor. Such water might flow through the cable and degrade its electrical properties.

Water or water vapor often enters a cable through puctures in the cable's outer jacket. These punctures may be the result of lightning strokes or of initial defects incurred during production or laying of cable. In the past, water entry has been minimized by sheathing the cable interior with water and vapor barriers. Such barriers are expensive. Also, such barriers, once they are penetrated, permit the entry of water which flows along the cable through interstices between the cable's conductors, fills the cable, and deteriorates its electrical qualities. Such deterioration manifests itself as an increase in the capacitance between cable conductors and results in increased losses. In telephone communication cables such losses can seriously degrade the operating performance of a telephone system. Ultimately, the water in the cable may corrode the conductors so as to cause open circuits.

THE INVENTION

According to a feature of the invention, these deficiencies are overcome by filling the intersticial spaces between the insulated conductors of a cable with a preheated heat-flowable, cool-viscous substance comprised of a mixture of petroleum jelly and a thermoplastic polymer having a high weight average molecular weight. Such a cable prevents both the ingress of water and its longitudinal flow in the cable. Preferably, the plastic polymer is one of a group consisting of crystalline polymers such as polyethylene, polybutene-1 or polypropylene, having a weight average molecular weight greater than 20,000, and more specifically greater than 40,000.

According to another feature of the invention, the substance contains 75 to 99% petroleum jelly and 25 to 1% polymer plastic. According to one embodiment, the mixture is a combination of 85% petroleum jelly and 15% polyethylene.

According to still another feature of the invention, the mixture is heated to a flowing temperature and applied to the cable's interstices in this flowable form and then cooled rapidly. The flowing material stiffens into a highly viscous material of putty-like consistency that forms itself to surrounding conditions without flowing or oozing.

These, and other features of the invention, are pointed out in the claims. Other objects and advantages of the invention will become evident from the following detailed description when read in light of the accompanying drawings.

BRIEF DESCRIPTION OF THE DRAWING

FIG. 1 is a cross-sectional elevation illustrating a telephone communication cable system embodying features of the invention;

FIG. 2 is a cross-sectional perspective of a portion of the cable in FIG. 1 embodying features of the invention;

FIG. 3 is a schematic illustration of a machine for manufacturing cable according to the features of the invention; and FIG. 4 is a detail of the system in FIG. 1.

DESCRIPTION OF PREFERRED EMBODIMENTS

In FIG. 1 separate lengths of buried multiconductor telephone cables 10, joined at their ends by respective conductor-connecting cable splices 12, transmit voice and other other messages from a telephone central office 14 to a subscriber station 16 above the ground 18. A pair 20 of the conductors from the cable 10 carry the messages from the cable splice 12 to the subscriber station 16. The buried cable 10 is subject to penetration of water that exists below the ground 18. Any break in the cable 10, whether caused by lightning strokes, or manufacturing tolerances, or laying defects, or other damage such as subsequent spade cuts may permit such penetration. If such penetration were permitted to go unchecked, the cable 10 as well as the splices 12, would become water-logged and the ability of the cable to transmit messages would be detrimentally affected by the high dielectric constant of the water introduced between the cable conductors.

Ultimately, the water might electrolytically corrode the wires and break them completely. The cable 10 substantially eliminates these problems.

FIG. 2 illustrates a portion of the cable 10. Here, a plurality of copper or aluminum conductors 22, insulated with respective surrounding polypropylene insulation 24 and twisted to form pairs 20 carry the messages in the cable. According to another embodiment of the invention the insulation 24 is polyethylene. Filling the intersticial spaces between the insulations 24 on the individual conductors 22 is a previously heated and then cooled mixture or blend 28 of petroleum jelly and a crystalline olefine polymer having a weight average molecular weight greater than 20,000.

An example of a mixture such as 28 is 85% petroleum jelly and 15% of .915 density polyethylene having a weight average molecular weight of 135,000.

The mixture 28 also fills the spaces between the conductor insulations 24 in the outer ring of insulated conductors 22 and a surrounding plastic core wrap 40. It wets all surfaces. A binder 32 holds the wrap 30 around the conductors 22 and mixture 28 so as to form a cable core 34 with them. The core wrap 30 and binder 32 are in turn covered on the outside with the mixture 28. A lightning protection aluminum shield 36 surrounds the core 34. A polyethylene jacket 38 in turn surrounds and embraces the shield 36. According to another embodiment of the invention the jacket is polypropylene. The shield 36 is covered inside and out with the mixture 28 so as to completely fill the intersticial spaces between the shield 36 and jacket 38 as well as between the shield 36 and the core 34. Essentially, the mixture 26 penetrates all spaces and wets all surfaces under the jacket 38 down to the insulation 24.

By virtue of the mixture 28 filling these spaces, the cable 10 is protected from entry of water even if the cable were surrounded by water and the jacket 38 and the shield 36 punctured by lightning or by mechanical means. The shield 36, by intercepting and absorbing the lightning, prevents it from affecting the conductors 22. However, it is subject to having holes burned therein. Thus, water can penetrate beyond this shield. However, the water penetrates only so far as permitted by the mixture 28. It can travel neither radially nor longitudinally because the mixture 28 fills all intersticies. Preferably, the mixture 28 also fills the splices 12.

The consistency of the mixture 28 is such as to prevent it from oozing, or being displaced and flowing, during handling. It has a putty-like consistency which is not sticky or greasy so that craftsmen can form splices by pealing away the jacket 38 and stripping the insulation 24 off the conductors 22. It is sufficiently putty-like so that it can be removed from around the insulated conductors 22 without instruments.

The mixture 28 has a dielectric constant of 2.2 to 2.4 almost equal to the dielectric constant of the polyethylene insulation 24. Thus, by filling or replacing the air in the intersticial spaces, the mixture 28 tends to raise the average dielectric constant of the cable and hence increase the capacitance between conductors of a cable equally constructed with air in the spaces. However, this effect of increased capacitance can be overcome by increasing the diameter of the insulations 24 about the conductors 22 so that the conductors 22 are spaced further apart from each other. The average capacitance of the cable is thereby reduced to a predetermined quantity.

A cable such as cable 10 is manufactured as illustrated in FIG. 3. Here, a capstan 40, on the right, draws the finished cable 10 from a plurality of supply reels 42, on the left, which carry the individual insulated conductors 22 with their insulation 24. The reels 42 form part of a twister-strander 44 which begins the process by twisting the conductors 22 about each other into pairs 20 and by stranding the pairs. The pairs of insulated conductors emerge partially separated as they enter a flooding tank 45. A pump 46 pumps the mixture 28 into the tank 45 from a heater 47. In the flooding tank 45, the mixture 28 is applied to each one of the insulated conductors 22 as they twist about each other more closely. The twisting and stranding actions become complete as the conductors 22 pass through the flooding tank 45 into a wiping die 48 that compresses the hitherto slightly-separated but mixture-covered insulated conductors 22 and squeezes and wipes excessive mixture off them as the pack of insulated conductors is moved.

A core wrapper 50 unreels core wrap material 52 and wraps it about the compacted insulated conductors 22. A binder 54 then secures the core wrap 30 about the conductors 22 by drawing the binder 32 from a reel 56. The entire procedure within the flooding tank 45, wiping die 48, core wrapper 50, and binder machine 52 takes place within six feet of the machine shown in FIG. 3 which is over 100 feet long.

After the binder 32 is applied, the thus formed core is cooled in a cooler 57. In FIG. 3 the cooler is embodied in a 24 foot travel interval through air during which the cable core is exposed to the air. This cools the heated mixture 28 which has arrived in the flooding tank 45 from the heater 47 at a temperature of 120° C. The cooling rate is approximately 60° C. per minute.

After cooling, the thus formed core 34 enters a second flooding tank 58 similar to the tank 45 wherein more hot mixture 28 arriving from the heater 47 floods the core wrap 30 and binder 32. A wiping die 60 removes excessive amount of mixture 28. A cooler 61, composed of a second air cooling interval, solidifies mixture 28. An aluminum former 62 reels a strip of shielding material 36 from a reel 64 and wraps it around the core 34 with the surrounding mixture 28 to form a longitudinal seam. A third flooding tank 66 receiving mixture 28 from the heater 47 floods the shield-covered core with more of the mixture 28. A wiping die 68 removes excessive mixture 28 and compacts the aluminum shield 36 about the core 34. An extruder 70 then forms the seamless polyethylene jacket 38 about the aluminum shield 36 with the still warm mixture 28. After a water cooling step in a cooling trough 72 that allows both the extruded jacket 38 and the mixture 28 to cool, the capatan 40 passes the completed cable 10 onto a takeup reel.

The machine of FIG. 3 may be modified to reel up the core 34 after it emerges from the cooler 61 onto a temporary reel and then unreel it in a second machine that applies the sheath composed of the shield 36 and jacket 38. This second machine then involves the aluminum former 62, the flooding tank 66, the die 68, the extruder 70, and the cooling trough 72.

The coolers 57 and 61, as well as the cooling trough 72, help give a mixture 28 which is not too tacky and soft. In the case of the coolers 57 and 61 they may be embodied as air cooling during a 24 or 30-foot travel length at speeds of about seven inches per minute at room temperature conditions. The water cooling trough 72 is necessary to cool both the extruded jacket 38 and the mixture 28.

Cables according to the invention are not limited to the use of polyethylene with the petroleum jelly. Other olefin polymers of high weight average molecular weight may be used. For example, any crystalline olefin polymer such as polypropylene or polybutene-1 may be added to the petroleum jelly. The polymer acts to convert the characteristics of petroleum jelly. The use of large quantities of petroleum jelly in this environment are desirable because of its excellent electrical qualities, low cost, ready availability, and easy handling. The polymer is more costly but need be used only in small quantities.

The mixture 28 essentially retains the low cost of petroleum jelly and is a nongreasy paste-like material that does not flow except at temperatures well above any possible ambient temperatures. It wets the conductor insulation well enough to prevent interfacial penetration of water. It is soft enough to adjust to the movement of the core conductors during handling at low or high temperatures without channeling and without causing appreciable stiffness of the cable. Addition of appropriate antioxidants in trace quantities such as .02% assures retention of these desired properties for many years. The high temperature flow point of the mixture 28 of 15% polyethylene and 85% petroleum jelly is considerably higher than that of petroleum jelly alone.

Preferably, the mixture 28 is composed of 80 to 97% petroleum jelly and 20 to 3% polymer plastic. However, the mixture may go from 75 to 99% petroleum jelly and 25 to 1% polymer plastic. In both these cases preferred results are achieved if the polymer plastic has high weight average molecular weights for high percentages of petroleum jelly and low weight average molecular weights for low percentages of petroleum jelly.

Preferably, when the plastic is polyethylene, the mixture 28 is composed of 80 to 97% petroleum jelly and 20 to 3% polyethylene. Preferably, the polyethylene has a weight average molecular weight higher than 100,000 when polyethylene comprises less than 14% of the mixture and a weight average molecular weight between 40,000 and 100,000 when the percentage of polyethylene is greater than 18%. Most preferably, the proportion of petroleum jelly is greater than 83 and less than 90% and polyethylene between 17 and 10% having a weight average molecular weight between 60,000 and 150,000.

With polypropylene the preferred range of petroleum jelly is between 87 and 99% when the polypropylene has weight average molecular weights between 100,000 and 350,000. Lower molecular weights of polypropylene are desirable for higher percentages of this substance and higher molecular weights for lower percentages of this substance.

Most preferably, the polypropylene comprises 2 to 12% of the mixture.

The preferred molecular weights of polybutene-1 correspond to three to four times those of polyethylene for corresponding percentages. With copolymers, preferably the percentage of petroleum jelly is between 83 and 97%. A most preferred range of petroleum jelly is 87 to 93%. Higher and lower percentages of petroleum jelly make higher and lower weight average molecular weights preferable.

One specific example of the mixture 28 is 85% petroleum jelly and 15% polyethylene, available under the trade name of Petrothene NA250, having a weight average molecular weight of approximately 80,000, a melt index of 250 and density of .926. When these components are first introduced in the heater 47, the polyethylene arrives in the form of pellets. The mixture 28 then exhibits a dielectric constant about 2.24. According to another example, the mixture 28 is composed of 85% petroleum jelly and 15% polyethylene having a weight average molecular weight of 135,000 and a density of .926. In all these cases the polyethylene may be introduced into the heater 47 in the form of pellets or powder.

Still another example of the mixture 28 is 89% petroleum jelly and 11% polyethylene, originally introduced in the form of pellets, and having a weight average molecular weight of 150,000 and a density of .926.

Yet another example of the mixture 28 is 89% petroleum jelly and 11% polybutene-1, originally introduced in pellet form, having a weight average molecular weight of 130,000. The resulting blend furnishes an intersticial filling of paste-like consistency.

Still another example of the mixture 28 is 89% petroleum jelly and 11% polypropylene having a weight average molecular weight of 300,000 and a density of .905.

As another example of mixture 28, the latter may be composed of 85% petroleum jelly, 14% polyethylene having a density of .926 and a weight average molecular weight of 80,000, and a 1% high density polyethylene, density .960, having a weight average molecular weight of 143,000.

Another example of the mixture 28 is composed of 88% petroleum jelly, 8% polyethylene having a weight average molecular weight of 80,000, a melt index of 250, and a density of .926, and 4% polypropylene having a weight average molecular weight of 300,000 and a density of .905.

Other examples of the mixture 28 are ones wherein the latter are composed of 85% petroleum jelly and 15% polyethylene having any one of the respective weight average molecular weights of 88,000, 60,000, 90,000 and 120,000, respective melt indices of 70, 250, 60 and 30, and respective densities of .913, .910, .923 and .923. These substances are available from the Union Carbide Corporation of New York, N.Y. and Bound Brook, N.J. under the designations of DFXD-3972, DFXD-3973, DFXD-4276 and DFXD-3971.

Another example of the mixture 28 is one having 20% polyethylene with a density of .926 and a weight average molecular weight of 80,000 and 80% petroleum jelly. According to another example, the mixture 28 is composed of 3% polyethylene having .95 density and 140,000 weight average molecular weight with 97% petroleum jelly.

In all these cases the mixture 28 in the cable has a composition corresponding to that of the material in the heater 47.

FIG. 4 illustrates a method for forming a cable system as shown in FIG. 1 with cable 10 and splice cases 12. Here the conductors 22 and insulation 24 are connected to similar conductors 22 with their insulation 24 in a second cable length 10 by means of connectors 80. A heater 82 heats the components of the mixture 28 such as that suitable for the cable 10 beyond the softening point of the polymer therein. A pump 84 or manual device transfers the heated mixture to the conductors so as to fill the interstices between the conductors 22, and the connectors 80. Preferably, the mixture is applied slowly so as to allow for rapid cooling before the new mixture is applied. When all the intersticial spaces have been filled, a binder 86 is supplied about the conductors and connectors to compress them and more mixture applied to the outside of the binder. A splice case 88 is then secured onto the cables 10 and the connectors 80 to form a splice 12. The pump 84 then pumps additional amounts of the substance from the heater 82 onto the remaining intersticial spaces of the splice case 88. A water spray may then be supplied outside the splice case 88 to cool the substance.

While embodiments of the invention have been described in detail, it will be obvious to those skilled in the art that the invention may be otherwise embodied within its spirit and scope.

What is claimed is:

1. A multipair telephone cable comprising:
   conductors insulated with a material selected from the group consisting of polyethylene and polypropylene;
   jacket means surrounding said plurality of insulated conductors, said insulated conductors forming between each other and between said conductors and said jacket means a plurality of interstices;
   and a viscous substance filling said interstices, said substance comprising a mixture of 83% to 90% petroleum jelly with 17% to 10% polyethylene, said polyethylene having a weight average molecular weight between 60,000 and 150,000 and a density greater than .910, said mixture having a melting point substantially below the melting point of said insulative material.

2. A communications cable comprising:
   a plurality of conductor pairs insulated with a material selected from the group consisting of polyethylene and polypropylene;
   jacket means surrounding said plurality of insulated conductors, said insulated conductors forming between each other and between said conductors and said jacket means a plurality of interstices;
   and a viscous substance filling said interstices, said substance comprising a mixture of substantially 85% petroleum jelly and 15% polyethylene, the latter having a melt index of 250, a density of .926 and a weight average molecular weight of approximately 80,000.

3. A communications cable pursuant to claim 2, wherein said conductor insulation is polypropylene, and wherein said substance has a dielectric constant substantially equal to the dielectric constant of said polypropylene insulation.

4. A communications cable comprising:
   a plurality of conductors insulated with material selected from the group consisting of polyethylene and polypropylene;
   jacket means surrounding said plurality of insulated conductors, said insulated conductors forming between each other and between said conductors and said jacket means a plurality of interstices;
   and a mixture filling said interstices, comprising 80% to 97% petroleum jelly with 20% to 3% polyethylene, said polyethylene having a weight average molecular weight of at least 40,000 and said mixture having a melting point below the melting point of said insulative material.

5. A communications cable comprising:
   a plurality of insulated conductors insulated with a material selected from the group consisting of polyethylene and polypropylene;
   jacket means surrounding said plurality of insulated conductors, said insulated conductors forming between each other and between said conductors in said jacket means a plurality of interstices;
   and a viscous substance filling said interstices comprising 87% to 99% petroleum jelly and 13% to 1% polypropylene, said polypropylene having a weight average molecular weight between 100,000 and 350,000, said mixture having a melting point below that of said conductor insulation.

References Cited

FOREIGN PATENTS

| | | | |
|---|---|---|---|
| 280,984 | 2/1968 | Australia | 174–25 C |
| 533,444 | 2/1941 | Great Britain | 174–25 C |
| 767,836 | 2/1957 | Great Britain | 174–25 C |
| 995,582 | 6/1965 | Great Britain | 174–23 |
| 581,830 | 10/1946 | Great Britain | 174–25 C |

BERNARD A. GILHEANY, Primary Examiner

U.S. Cl. X.R.

174—14, 23 C, 25 C